United States Patent [19]

Nakano

[11] Patent Number: 4,665,588
[45] Date of Patent: May 19, 1987

[54] DEGAUSSING COIL HOLDER

[75] Inventor: Yoshihito Nakano, Yokohama, Japan

[73] Assignee: Kitagawa Industries Co., Ltd., Nagoya, Japan

[21] Appl. No.: 631,206

[22] Filed: Jul. 16, 1984

[30] Foreign Application Priority Data

Jul. 20, 1983 [JP] Japan .............. 58-112456[U]

[51] Int. Cl.⁴ .............................................. B65D 63/10
[52] U.S. Cl. .................................. 24/16 PB; 248/74.3
[58] Field of Search ............. 24/16 R, 16 PB, 30.5 R, 24/30.5 P, 17 AP, 150 FP, 484, 305, 326, 336, 335, 339; 248/60, 68.1, 74.3; 292/318, 321, 322, 325

[56] References Cited

U.S. PATENT DOCUMENTS

| | | | |
|---|---|---|---|
| 3,632,071 | 1/1972 | Cameron et al. | 24/16 PB X |
| 3,654,669 | 4/1972 | Fulton | 24/16 PB |
| 3,672,615 | 6/1972 | Fiorentino | 24/16 PB X |
| 3,739,429 | 6/1973 | Kohke | 24/16 PB |
| 3,747,164 | 7/1973 | Fortsch | 24/16 PB |
| 3,816,878 | 6/1974 | Fulton et al. | |
| 3,908,233 | 9/1975 | Caveney et al. | 24/16 PB |
| 3,973,292 | 8/1976 | Bonnet | 24/16 PB |
| 3,991,444 | 11/1976 | Bailey | 24/16 PB |
| 4,502,187 | 3/1985 | Kitagawa | 24/16 PB |

FOREIGN PATENT DOCUMENTS

| | | | |
|---|---|---|---|
| 75501 | 3/1983 | European Pat. Off. | 24/16 PB |
| 1519868 | 8/1978 | United Kingdom | 24/16 PB |
| 2049019 | 12/1980 | United Kingdom | 248/68 R |
| 2097053 | 10/1982 | United Kingdom | 24/16 PB |

Primary Examiner—Francis K. Zugel
Assistant Examiner—James R. Brittain
Attorney, Agent, or Firm—Oblon, Fisher, Spivak, McClelland & Maier

[57] ABSTRACT

A degaussing coil holder according to the present invention comprises a retaining member provided with insertion holes formed in right and left positions adjacent to each other and further provided in the insertion holes with retaining pawls which are urged and project in directions opposite to each other, and band straps each provided at one end thereof with a degaussing coil holding portion, with the other ends being inserted through the insertion holes from openings of the holes positioned in opposite directions, and further provided on one side thereof with a series of ratchet serrations adapted to engage the associated retaining pawl in the insertion hole. Therefore, the unevenness is reduced and the volume efficiency is high. Moreover, the holding tension between degaussing coil portions can be adjusted over a wide range.

4 Claims, 12 Drawing Figures 4,665,588

DEGAUSSING COIL HOLDER

BACKGROUND OF THE INVENTION

(1) Field of Art

The present invention relates to a holder for degaussing coil attached to electric products, especially television receivers.

(2) Prior Art

In television receivers, a degaussing coil is mounted in close contact with a conical surface of a cathode-ray tube to improve the volume efficiency. Generally, for mounting a cathode-ray tube to a television receiver box, a tension band is stretched in a headband-like fashion around a rectangular outer periphery adjacent to the display plane, and the cathode-ray tube is held in place by four mounting pieces projecting radially from the bent portions of the band. Mounting of a degaussing coil is performed also by utilization of such radially projecting mounting pieces. As is well known, the cathode-ray tube has a high-tension portion, which is provided along a conical surface on one long side of a rectangular cone of the tube. A degaussing coil is also mounted along a conical surface on a long side of the rectangular cone. In mounting a degaussing coil in a loop-like fashion along the other long side conical surface free from the high-tension portion, even if the loop moves toward the vertex along the conical surface, it will cause no problem because the loop is out of contact with the high-tension portion. On the other hand, in the case of mounting the degaussing coil along the long side conical surface including the high-tension portion, care must be exercised to avoid contact of the loop with the high-tension portion. Heretofore, with respect to cathode-ray tubes of different sizes, there have been developed holders suitable for mounting a degaussing coil to the conical surface on the high-tension side respectively according to sizes of the cathode-ray tubes. However, in several types of cathode-ray tubes for which there is the greatest demand, there has not yet been proposed a degaussing coil holder capable of being employed in common to many cathode-ray tubes having different long-side lengths.

SUMMARY OF THE INVENTION

According to the present invention, there is provided a degaussing coil holder applicable to several types of cathode-ray tubes having different long side lengths, being not bulky and easy to handle and contemplating an improvement of volume efficiency. The gist of the invention resides in a degaussing coil holder comprising a retaining member provided with insertion holes formed in right and left positions adjacent to each other and further provided in the insertion holes with retaining pawls which are urged and project in directions opposite to each other, and band straps each provided at one end thereof with a degaussing coil holding portion, with the other ends being inserted through the insertion holes from openings of the holes positioned in opposite directions, and further provided on one side thereof with a series of ratchet serrations adapted to engage the associated retaining pawl in the insertion hole.

DESCRIPTION OF A PREFERRED EMBODIMENT

The present invention will be described hereinunder with reference to the accompanying drawings which illustrate an embodiment of the invention.

Figure 1:
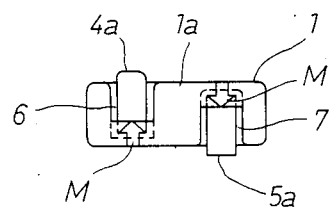
FIGS. 1 through 6 are a plan view, a front view, a left side view, a right side view, a sectional view taken on line 5—5 of FIG. 2 and a sectional view taken on line 6—6 of FIG. 2, respectively, of a retaining member according to an embodiment of the present invention.
Figure 2:
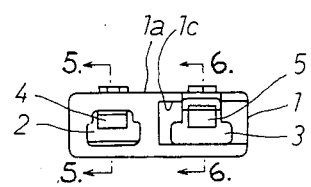
Figure 3:
Figure 4:
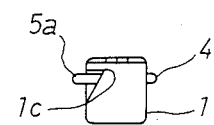
Figure 5:
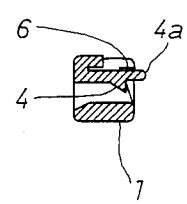
Figure 6:
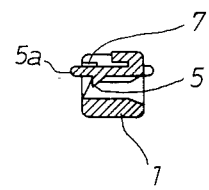

In these figures, the reference numeral 1 denotes a retaining member having insertion holes 2 and 3 for insertion therethrough of later-described band straps, the insertion holes 2 and 3 being formed in left and right positions adjacent to each other so as to have flat openings when viewed from the front. In the insertion hole 2 is provided a retaining pawl 4 projecting toward an opening of the hole 2, while in the insertion hole 3 is provided a retaining pawl 5 projecting toward an opening of the hole 3 positioned on the side opposite to the opening toward which the retaining pawl 4 projects. The retaining pawls 4 and 5 are formed in an urged state integrally with the retaining member 1 and are integrally provided with unlocking levers 4a and 5a projecting from openings of the insertion holes, as shown in the sectional views of FIGS. 5 and 6. In an upper surface 1a of the retaining member 1 are formed slits 6 and 7 having a width somewhat larger than that of the retaining pawls 4 and 5 in positions corresponding to those pawls so that the unlocking levers 4a and 5a of the retaining pawls can be lifted with a finger at the time of disengagement of the pawls from the ratchet serrations of the band straps. Further, for ease of fingering the unlocking levers 4a and 5a, notches 1b and 1c are provided on the opening surfaces from which the unlocking levers 4a and 5a project. On the upper surface 1a are embossed arrows M as shown in the figure, which arrows indicate inserting directions of later-described band straps and may be omitted as the case may be.

Figure 7:
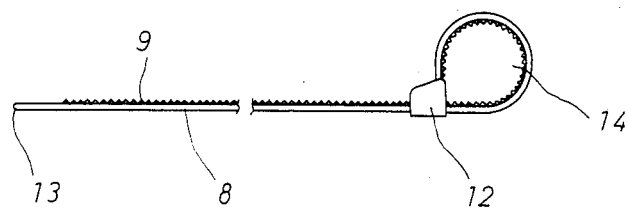
FIG. 7 is a side view of a band strap.
Figure 8:
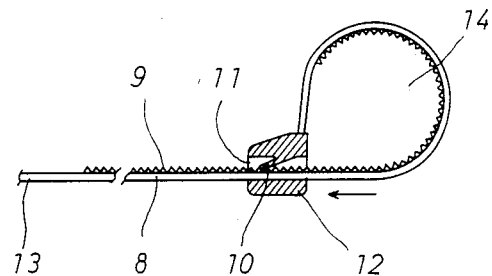
FIG. 8 is a partial side view of the band strap, partly in section.

In FIG. 7, the numeral 8 denotes a band strap to be inserted into the insertion hole 2 or 3 of the retaining member 1. On one side of the band strap 8 are formed a series of ratchet serrations 9 comprising a large number of crests. As shown in the partial side view partly in section of FIG. 8, to one end of the band strap 8 is integrally connected a head 12 having an insertion hole 11 in which is provided an engaging pawl 10. The engaging pawl 10 projects in an inserting direction (shown with arrow), while the other end 13 of the band strap 8 is inserted through the insertion hole 11 of the head 12, whereby there is formed a ring 14 for clamping a degaussing coil (not shown).

Figure 9:
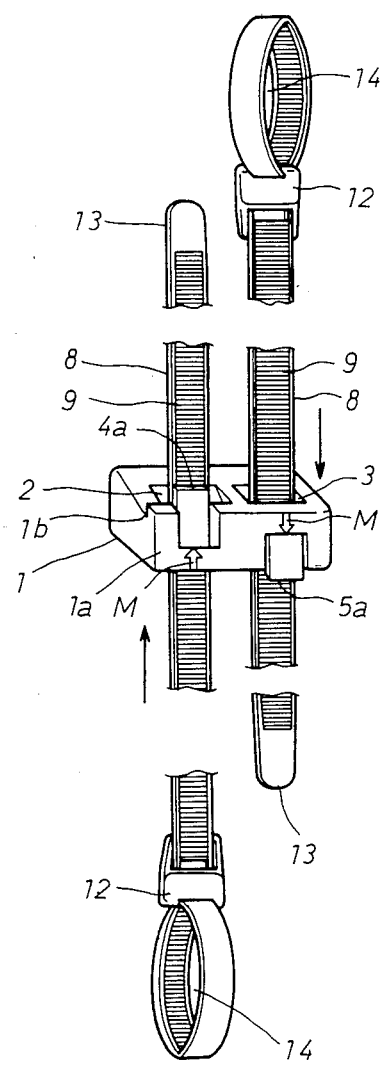
FIGS. 9 and 10 are perspective views each showing a state of use.
Figure 10:
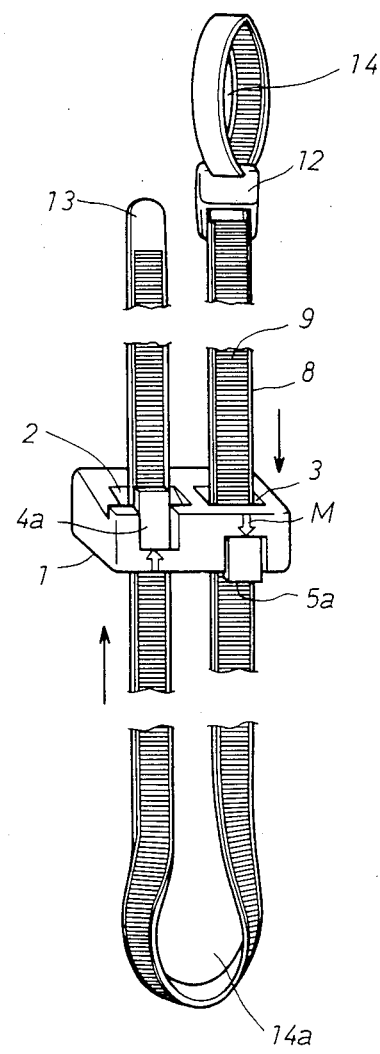
Figures 11, 12:
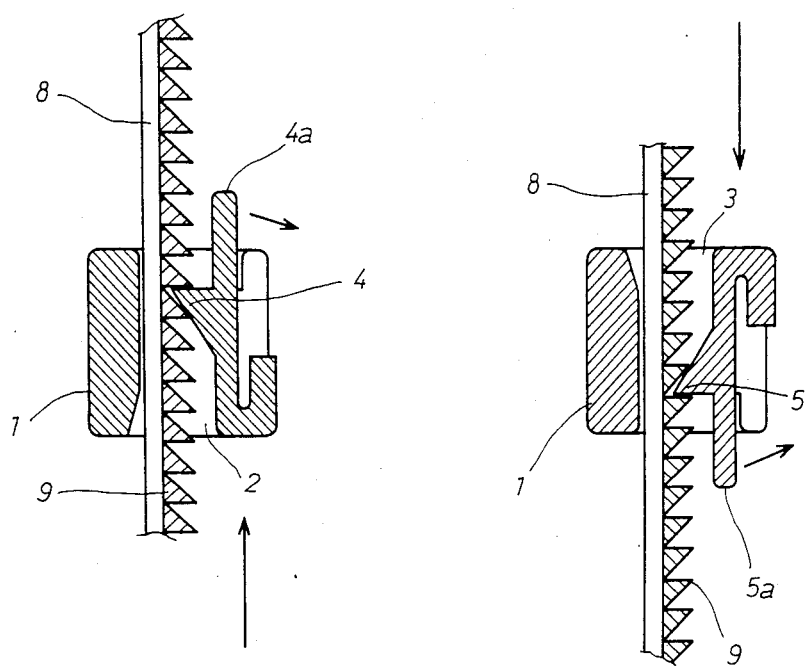
FIGS. 11 and 12 are enlarged sectional views each showing a state of engagement between the retaining member and the band strap.

The degaussing coil holder of the present invention is used, for example, as shown in FIGS. 9 and 10. In the example shown in FIG. 9, the other ends 13 of two band straps 8 which clamp in the respective rings 14 a degaussing coil (not shown) mounted in close contact with a cathode-ray tube of a television receiver are inserted from directions opposite to each other (as shown with arrows) into the insertion holes 2 and 3. The other ends 13 of the two band strap 8 are then pulled while the retaining member 1 is supported with fingers, thereby holding the degaussing coil portions in predetermined positions. Thus, the band straps 8 are disposed on the same horizontal plane while supporting each other under tension through the engagement with the retaining member 1. Therefore, the volume efficiency is good. In this condition, reference is here made to FIG. 11, which is an enlarged sectional view showing one band strap 8 as inserted in the insertion hole 2. The retaining pawl 4 in the insertion hole 2 is in engagement with ratchet serrations 9 formed on one side of one band strap 8. Reference is here made also to FIG. 12, in which the retaining pawl 5 in the insertion hole 3 is in engagement with ratchet serrations 9 formed on one side of the other band strap 8. When the stretching between the band straps 8 is large, and an excessive tension is applied between the degaussing portions clamped by the rings 14, the retaining member 1 tilts, whereby the degree of the tension can be seen. This state can be corrected by adjusting the length of insertion of the band strap 8 after pulling back the unlocking lever 4a or 5a in the arrowed direction with a finger to disengage the retaining pawl 4 or 5 from the ratchet serrations 9. When it is necessary to release the holding for the degaussing coil, the unlocking lever 4a or 5a is pulled back in the arrowed direction to disengage the retaining pawl 4 or 5 from the ratchet serrations, and then the whole of the band strap 8 is pulled out from the insertion hole 2 or 3.

Referring to FIG. 10, there is shown an example of use of a degaussing coil holder comprising the retaining member 1 and one band strap 8, in which the band strap 8 is inserted through the insertion hole 3 of the retaining member 1, then turned up to form a ring 14a for holding a degaussing coil, and is further pulled to let the other end 13 pass through the insertion hole 2. In this state the holder is used. This example of use is advantageous in that the band strap 8 does not come off easily during use because both the retaining pawl 5 in the insertion hole 3 and the retaining pawl 4 in the insertion hole 2 engage the ratchet serrations 9 of the same band strap 8.

In the degaussing coil holder of the present invention, as set forth hereinabove, two band straps are inserted through a single retaining member having insertion holes adjacent to each other in right and left positions and are disposed engagedly on the same plane, so the unevenness is less than conventional degaussing coil holders and the volume efficiency is greatly improved. Thus, the holder of the present invention is suitable for a degaussing coil which is mounted in close contact with a cathode-ray tube. Further, since the retaining pawls are each provided with the unlocking lever so that the band straps and the retaining member can be engaged with and disengaged from each other, the holding tension between degaussing coil portions can be adjusted over a wide range, and the degree of the tension can be confirmed by tilting of the retaining member. Thus, the degaussing coil holder of the present invention has many advantages.

What is claimed is:
1. A holder comprising:
   (a) a band strap having a head portion and body portion, said body portion of said band strap having a first surface, a second surface, a first end, a second end, and a plurality of ratchet serrations on said first surface of said band strap, said head portion of said band strap being attached to said first end of said body portion of said band strap and having an insertion hole therethrough and an engaging pawl located in said insertion hole in said head portion of said band strap;
   (b) said body portion of said band strap, said plurality of ratchet serrations on said first surface of said body portion of said band strap, said insertion hole in said head portion of said band strap, and said engaging pawl in said insertion hole in said head portion of said band strap being sized, shaped, and positioned so that said second end of said body portion of said band strap extends through said insertion hole in said head portion of said band strap in a first direction and said engaging pawl in said insertion hole in said head portion of said band strap engages said plurality of ratchet serrations on said first surface of said body portion of said band strap and said body portion of said band strap forms a first ring;
   (c) a retaining member having:
      (i) a body portion;
      (ii) a first surface on said body portion of said retaining member;
      (iii) a second surface on said body portion of said retaining member opposite to said first surface on said body portion of said retaining member;
      (iv) a first insertion hole extending from said first surface on said body portion of said retaining member to said second surface on said body portion of said retaining member;
      (v) a second insertion hole extending from said first surface on said body portion of said retaining member to said second surface on said body portion of said retaining member in parallel to said first insertion hole extending from said first surface on said body portion of said retaining member to said second surface on said body portion of said retaining member;
      (vi) a first retaining pawl resiliently joined to said body portion of said retaining member, located in said first insertion hole in said body portion of said retaining member, and extending towards said first surface on said body portion of said retaining member; and
      (vii) a second retaining pawl resiliently joined to said body portion of said retaining member, located in said second insertion hole in said body portion of said retaining member, and extending towards said second surface on said body portion of said retaining member;
   (d) said body portion of said band strap, said plurality of ratchet serrations on said first surface of said body portion of said band strap, said first insertion hole in said body portion of said retaining member, said second insertion hole in said body portion of said retaining member, said first retaining pawl in said first insertion hole in said body portion of said retaining member, and said second retaining pawl in said second insertion hole in said body portion of said retaining member being sized, shaped, and positioned:
      (i) so that said second end of said body portion of said band strap extends through said first insertion hole in said body portion of said retaining member in a first direction and said first retaining pawl in said first insertion hole in said body portion of said retaining member engages said plurality of ratchet serrations on said first surface of said body portion of said band strap and

(ii) so that said second end of said body portion of said band strap extends through said second insertion hole in said body portion of said retaining member in a second direction, opposite to the direction in which said second end of said body portion of said band strap extends through said first insertion hole in said body portion of said retaining member and said second retaining pawl in said second insertion hole in said body portion of said retaining member engages said plurality of ratchet serrations on said first surface of said body portion of said band strap and said body portion of said band strap forms a second ring.

2. A holder as recited in claim 1 wherein said retaining member further comprises:

(a) a first unlocking lever attached to said first retaining pawl in said first insertion hole in said retaining member and projecting outwardly of said first insertion hole in said retaining member, said first unlocking lever being sized, shaped, and positioned so that it can be manipulated manually to release engagement between said first retaining pawl in said first insertion hole in said retaining member and said plurality of ratchet serrations on said first surface of said body portion of said band strap, and (b) a second unlocking lever attached to said second retaining pawl in said second insertion hole in said retaining member and projecting outwardly of said second insertion hole in said retaining member, said second unlocking lever being sized, shaped, and positioned so that it can be manipulated manually to release engagement between said second retaining pawl in said second insertion hole in said retaining member and said plurality of ratchet serrations on said first surface of said body portion of said band strap.

3. A holder as recited in claim 2 wherein said retaining member further has:

(a) a first through slit communicating with said first insertion hole in said retaining member and facilitating manual manipulation of said first unlocking lever and (b) a second through slit communicating with said second insertion hole in said retaining member and facilitating manual manipulation of said second unlocking lever.

4. A holder as recited in claim 1 wherein said body portion of said band strap and said head portion of said band strap are formed integrally.

* * * * *